United States Patent
Zhang et al.

(10) Patent No.: US 12,372,715 B2
(45) Date of Patent: Jul. 29, 2025

(54) FIBER OPTIC IMAGE INVERTER WITH ULTRA-SHORT TWISTER, FABRICATION METHOD THEREFOR, APPLICATION THEREOF, AND RELATED COMPOSITION

(71) Applicant: CHINA BUILDING MATERIALS ACADEMY CO., LTD., Beijing (CN)

(72) Inventors: Lei Zhang, Beijing (CN); Jinsheng Jia, Beijing (CN); Yonggang Huang, Beijing (CN); Yue Zhao, Beijing (CN); Jiuwang Wang, Beijing (CN); Xiaofeng Tang, Beijing (CN); Xian Zhang, Beijing (CN); Jing Zhang, Beijing (CN); Yun Wang, Beijing (CN); Yu Shi, Beijing (CN); Zhiheng Fan, Beijing (CN); Haoyang Yu, Beijing (CN); Puguang Song, Beijing (CN); Yajie Du, Beijing (CN); Yang Fu, Beijing (CN)

(73) Assignee: CHINA BUILDING MATERIALS ACADEMY CO., LTD., Beijing (CN)

( * ) Notice: Subject to any disclaimer, the term of this patent is extended or adjusted under 35 U.S.C. 154(b) by 0 days.

(21) Appl. No.: 18/899,899

(22) Filed: Sep. 27, 2024

(65) Prior Publication Data
US 2025/0172749 A1 May 29, 2025

Related U.S. Application Data

(63) Continuation of application No. PCT/CN2024/092291, filed on May 10, 2024.

(30) Foreign Application Priority Data

Nov. 24, 2023 (CN) .......................... 202311579576.3

(51) Int. Cl.
G02B 6/06 (2006.01)
C03B 37/028 (2006.01)
C03B 37/029 (2006.01)

(52) U.S. Cl.
CPC .............. *G02B 6/06* (2013.01); *C03B 37/028* (2013.01); *C03B 37/029* (2013.01)

(58) Field of Classification Search
CPC ........ G02B 6/06; C03B 37/028; C03B 37/029
See application file for complete search history.

(56) References Cited

U.S. PATENT DOCUMENTS 4,243,298 A 1/1981 Kao et al.
11,802,071 B2 * 10/2023 Zhang ............... C03B 37/01268
(Continued)

FOREIGN PATENT DOCUMENTS

CN 1828348 A 9/2006
CN 103482867 A 1/2014
(Continued)

OTHER PUBLICATIONS

International Search Report and Written Opinion of the International Searching Authority dated Aug. 17, 2024 as received in Application No. PCT/CN2024/092291.
(Continued)

*Primary Examiner* — Daniel Petkovsek
(74) *Attorney, Agent, or Firm* — Maschoff Brennan

(57) ABSTRACT

The present application discloses a method for fabricating a fiber optic image inverter with an ultra-short twister. The method includes: drawing a glass rod with a low refractive index and a high strain point temperature into a surrounding pipe fiber; drawing a glass rod with a high refractive index and a high transmittance into a filling glass fiber, and then drawing into a casing pipe absorption fiber; uniformly surrounding an outer side of a cladding glass pipe with the (Continued)

surrounding pipe fiber, and matching a core glass rod and the cladding glass pipe to be drawn into a mono fiber; and then performing fabrication of a multi fiber, fabrication of a multi-multi fiber, heat press fusion and twisting operation in sequence. The fiber optic image inverter with an ultra-short twister with a high resolution and a high contrast and clear imaging is obtained and applied in a low-light-level image intensifier.

17 Claims, 4 Drawing Sheets

(56) References Cited

U.S. PATENT DOCUMENTS

2017/0205576 A1 7/2017 Tabor et al.
2024/0092679 A1* 3/2024 Zhang ................... C03C 3/091

FOREIGN PATENT DOCUMENTS

| CN | 104591542 | A | 5/2015 |
| CN | 111393023 | A | 7/2020 |
| CN | 112679087 | A | 4/2021 |
| CN | 115469395 | A | 12/2022 |
| CN | 115602351 | A | 1/2023 |
| CN | 117534319 | A | 2/2024 |
| CN | 117602817 | A | 2/2024 |
| CN | 117602818 | A | 2/2024 |
| CN | 117602825 | A | 2/2024 |
| CN | 117602829 | A | 2/2024 |
| CN | 117623620 | A | 3/2024 |
| CN | 117658443 | A | 3/2024 |
| CN | 117658457 | A | 3/2024 |
| CN | 117666014 | A | 3/2024 |
| JP | 2000-310719 | A | 11/2000 |
| WO | 2006100488 | A1 | 9/2006 |

OTHER PUBLICATIONS

CN Notification to Grant Patent Right for Invention dated Apr. 16, 2024 in application 202311579576.3.
CN Office Action dated Mar. 5, 2024 in application 202311579576.3.

* cited by examiner

FIBER OPTIC IMAGE INVERTER WITH ULTRA-SHORT TWISTER, FABRICATION METHOD THEREFOR, APPLICATION THEREOF, AND RELATED COMPOSITION

CROSS-REFERENCE TO RELATED APPLICATIONS

The present application is a continuation of International Application No. PCT/CN2024/092291 filed on May 10, 2024, which claims priority to Chinese Patent Application No. 202311579576.3 filed on Nov. 24, 2023. Both applications are incorporated by reference herein in their entireties.

TECHNICAL FIELD

The present application relates to the field of fabrication of fiber optic imaging elements, in particular to a method for fabricating a fiber optic image inverter with ultra-short twister, and application.

BACKGROUND

Ability of night fighting has become a significant symbol for evaluating combat capability of troops in modern high-tech warfare. A helmet night-vision device emerges for making a soldier adapt to more complicated night combat environments and more early discover and more clearly see a target in all-weather combats. The helmet night-vision device is to mount a low-light-level night vision device on a helmet, is mainly applied to aspects of pilots, night drivers, special troops for combats etc., and has become an important weapon device for soldiers. The night-vision device mounted on the helmet enables a pilot to observe the outside in dim light and provides a wider field of view, so a helicopter can drive close to the ground under a low brightness condition. However, mounting the night-vision device in front of a standard aviation helmet of the pilot causes a united center of gravity of the night-vision device, the helmet and the head to shift upper front from a normal center of gravity of the head. An additional weight of the night-vision device and a mounting support connected thereto and resulting center-of-gravity shift turn out to be an added burden for the pilot, and as a consequence, the pilot feels tired during routine flight and may be injured in neck during unexpected maneuvering flight. As for some systems, a counterweight or a battery of the night-vision device is mounted in the rear of the helmet, which may correct part of center-of-gravity shift but may increase a total weight borne by the head, limit head movement in the helmet and greatly reduce a potential observation range of the pilot. Moreover, the helmet night-vision device turns out to be an important factor of affecting pilot's health and flight safety due to too large mass, unstable center of gravity, expanded outline, limited anti-noise capacity, poor comfort and other issues. Wearing the aviation helmet for a long time is prone to causing a large burden for the head and neck, a high thermal load, hearing loss, visual impairment, increased mental load and other issues, aggravating flight fatigue and possibly directly affecting an operation level of the pilot and threatening the flight safety in a severe case, especially, after wearing for a long time, neck pain, hearing loss, a large thermal load, poor comfort and other phenomena are prone to occurring, thus the flight fatigue of the pilot is intensified, operational coordination of the pilot is reduced, strength of action of the pilot is insecure, flight actions are difficult to complete deftly and accurately, and an occurrence rate of errors due to human factors is increased remarkably. For remaining the advantage of a night-vision technology and meeting the overall requirement for high-mobility operation of soldiers in troops, the helmet night-vision device is constantly developed in a tendency to miniaturization, light weight and integration, which aims to reduce a size and a weight, reduce protrusion of an objective lens and an ocular lens, make the center of gravity closer to the face, increase the field of view and improve visual acuity, thereby making the night-vision device more suitable for being worn on the head for a long time.

Fiber optic image inverter, as a core optical component in the helmet night-vision device, is a photoelectric imaging component with excellent properties and has characteristics of large numerical aperture, high light-transmission efficiency, high resolution, authentic and clear in image transmission and optical characteristics of zero thickness, simple structure, small size, low weight, good air-tightness, small distortion, fewer spots, low multistage coupling loss, high coupling efficiency, capability of improving edge image quality and the like, which serves as an optical output window of a low-light-level image intensifier, plays an important role in improving quality of an imaging device and becomes a high-tech cutting-edge product in the optoelectronic industry of the modern world. In order to meet the development requirements for miniaturization, light weight, resolution and image definition of the helmet night-vision device, it is always expected to reduce a total weight and size of the helmet night-vision device by reducing the height, size and weight of the fiber optic image inverter. Related researches show that if the weight of the fiber optic image inverter can be reduced by 30%, a total weight of related structures, components, battery structures and the like matching the helmet night-vision device can be reduced by 50% or more, which can greatly meet the requirement of flexibility and mobility of the soldiers in combats and plays a significant role in improving night fighting ability of the troops. Thus, it is an urgent demand to research and develop the fiber optic image inverter with ultra-short twister for meeting the requirements of miniaturization and light weight of the helmet night-vision device.

The fiber optic image inverter with ultra-short twister is fabricated by compressing the twisting area of fiber optic image inverter and has lower height and weight than a normal fiber optic image inverter. However, compressing the twisting area of the normal fiber optic image inverter may stretch and deform edge fibers of the fiber optic image inverter more seriously, slippage may also occur between optical fibers, and especially, a thickness of a cladding layer of the edge optical fiber may be stretched to be thinner. As the optical fibers are completely fused together through a cladding glass, the adjacent optical fibers are quite close, stretching and deforming of the fibers may be non-uniform due to the glass of the cladding layer when the twisting area is compressed, so a light ray entering optical core material glass has a phenomenon of optical crosstalk in the cladding layer between the adjacent fibers, as a consequence, an inputted light ray penetrates through the cladding layer during a total reflection process to cause a permeating phenomenon, then the total reflection mechanism of the edge optical fibers disappears, and the light transmission and image transmission properties of the optical fibers are directly affected, and thus issues such as resolution loss at edge, reduction of transmittance, decrease of contrast and distortion of image transmission occurred in the fiber optic image inverter with ultra-short twister. Especially, a fabrication technique for the ultra-short twister image inverter will be quite difficult as the twisting area of the fiber optic image inverter is compressed shorter and shorter, not only the resolution loss at edge, but also influences of material matching, mutual diffusion of components in the technique during the fabrication process, and the like have to be considered in the fabrication process, so the fiber optic image inverter with ultra-short twister is very difficult to made.

SUMMARY

In order to solve the technical problems in the fabrication of the fiber optic image inverter with ultra-short twister in the prior art, the present application provides a method for fabricating the fiber optic image inverter with ultra-short twister with high resolution, high contrast and clearer imaging.

The technical solution adopted by the present application for solving the above issues is as follows.

A method for fabricating the fiber optic image inverter with ultra-short twister includes the following steps:

(1) surrounding pipe fiber drawing: drawing a round glass rod with a low refractive index and a high strain point temperature into the surrounding pipe fiber;

surrounding pipe fiber drawing mainly aims to increase a strain point temperature of glass and enhance a cladding layer drawing strength of an optical fiber, so that a cladding layer is not prone to breaking during a process for fabricating the fiber optic image inverter with ultra-short twister and a total reflection structure of the optical fiber is ensured.

The drawn surrounding pipe fiber has a diameter selected from Φ1.6 mm to Φ2.0 mm. If the fiber diameter is less than Φ1.6 mm, the purpose of enhancing the cladding layer drawing strength of the optical fiber cannot be achieved. If the fiber diameter is greater than Φ2.0 mm, the cladding layer of the optical fiber may be thickened, more useless luminous flux is generated, and the contrast and transmittance of the fiber optic image inverter will be reduced;

(2) filling glass fiber drawing: drawing a glass rod with a high refractive index and a high transmittance into a triangular filling glass fiber; wherein the filling glass fiber mainly aims to enhance the internal structure of the optical fiber and increase the filling coefficient, so that fiber structure slippage does not occurred in the fiber optic image inverter with ultra-short twister during the fabrication process, and meanwhile, transmission of the effective luminous flux will be improved;

(3) casing pipe absorption fiber drawing: preparing the light absorption glass with good light absorption property into a light absorption glass rod, matching the light absorption material glass rod and a cladding glass pipe, and then drawing to obtain the casing pipe absorption fiber; wherein drawing of a light absorption fiber cased with the cladding glass pipe is intended to reduce the diffusion of light absorption glass and improve the optical uniformity of the internal structure of the optical fiber;

(4) mono fiber drawing: uniformly surrounding an outer side of the cladding glass pipe with the surrounding pipe fiber, then matching a core glass rod with high refractive index and the cladding glass pipe surrounded with the surrounding pipe fiber, and then followed by drawing to obtain a mono fiber, wherein the mono fiber has a diameter from Φ2.4 mm to Φ4.20 mm; if the fiber diameter of the mono fiber is less than 2.4 mm, the triangular hole in the multi assembly rod is too small, which does not facilitate inserting and filling of the filling glass fiber; and if the fiber diameter of the mono fiber is greater than 4.2 mm, roundness uniformity of the drawn mono fiber is not easy to control, and fiber scattering and fiber cracking are prone to occurring to a structure of the multi assembly rod. Thus, according to the fiber diameter of mono fiber, the filling glass fiber drawn in step 2 may be selected as a triangular filling glass fiber; and the height of the filling glass fiber may be selected from 0.50 mm to 0.95 mm;

(5) multi fiber drawing: arranging the drawn mono fibers into a multi assembly rod with an orthohexagonal cross section, wherein the number of mono fibers on each side of the multi assembly rod is N, and the total number of the mono fibers arranged in the multi assembly rod is (3N(N−1)+1); and replacing a mono fiber arranged in the center of the multi assembly rod with the casing pipe absorption fiber, wherein the fiber diameter of the replaced mono fiber is the same as the substituting casing pipe absorption fiber; and filling and inserting the filling glass fiber into the triangular hole of the multi assembly rod; and drawing the above multi assembly rod into the multi fiber, wherein a size of hexagonal opposite sides of the multi fiber may be selected from 1.10 mm to 1.30 mm.

In the multi assembly rod obtained after fiber replacement, the number of the mono fibers on each side of the multi assembly rod is 8≥N≥3; if the number of the mono fibers on each side is less than 3, a gap of the internal structure is too large, which leads to increase of useless luminous flux and occurrence of a defect of fixed-pattern noise in the fabricated fiber optic image inverter; and if the number of the mono fibers on each side more than 8, arrangement of the multi assembly rod is too thick, the internal structure is prone to going through a risk of fiber cracking and fiber scattering, so compactness of the internal structure of the fiber is not easy to control, and the fabricated fiber optic image inverter has defects of grids and spots. The number N of the mono fibers on each side may be selected as 6;

(6) multi-multi fiber drawing: arranging the drawn multi assemblies into a multi-multi assembly rod with an orthohexagonal cross section, then drawing the multi-multi assembly rod into the multi-multi fiber, and then cutting the drawn multi-multi fiber with a fixed length to be arranged into a fiber assembly bundle; wherein a size of hexagonal opposite sides of the multi-multi fiber ranges from 0.86 mm to 1.06 mm;

(7) heat press fusing: putting the arranged fiber assembly bundle in a heat press fusion mold, then putting the heat press fusion mold in a heat press fusion furnace, performing heat press fusion according to a designed compression ratio of the fiber assembly bundle before and after heat press fusion, and obtaining a fused boule after heat press fusion;

(8) twisting operation: subjecting the fused boule to cutting, rounding and grinding machining treatments to obtain a fiber optic image inverter block, and subjecting the fiber optic image inverter block to 180° twisting operation in an ultra-short high-temperature twisting furnace to obtain the fiber optic image inverter with ultra-short twister.

The heating body of ultra-short high-temperature heating furnace has a width ranging from 3 mm to 4 mm; if the width of the heating body in the heating furnace is less than 3 mm, a temperature and heating power needed for twisting operation of the fiber optic image inverter cannot be achieved; and if the width of the heating body in the heating furnace is more than 4 mm, the fiber optic image inverter with ultra-short twister cannot be obtained.

A distance from the heating body in the ultra-short high-temperature heating furnace to the surface of the fiber optic image inverter block ranges from 1.0 mm to 2.5 mm; if the distance is less than 1.0 mm, a surface temperature is prone to being too high, and reduction of an edge transmittance occurs to the fabricated image inverter; and if the distance is more than 2.5 mm, a heating area is widened, and the fiber optic image inverter with ultra-short twister is not prone to being fabricated.

Twisting operation time for twisting the fiber optic image inverter block by 180° ranges from 2 minutes to 9 minutes; if the twisting time is shorter than 2 minutes, the surface temperature of the image inverter block is too high, and the edge transmittance is prone to decreasing; and if the twisting time exceeds 9 minutes, the resolution at edge of the fiber optic image inverter with ultra-short twister will be reduced.

The fiber optic image inverter with ultra-short twister fabricated through the method of the present application has an overall height not more than 15 mm and a weight less than 20 g; a fiber diameter of the fabricated fiber optic image inverter with ultra-short twister is less than or equal to 4.0 µm; the fiber optic image inverter with ultra-short twister has a center resolution greater than 140 lp/mm and an edge resolution greater than 110 lp/mm; optical crosstalk of the fiber optic image inverter with ultra-short twister at a position 0.1 mm away from a cutter edge is less than 1.0%; the fiber optic image inverter with ultra-short twister has a good light transmission property and has a transmittance greater than 70% within a wavelength range from 400 nm to 700 nm; and the fiber optic image inverter with ultra-short twister has a good fixed-pattern noise property and has no obvious multifiber boundary after being observed under a 10× microscope.

The present application further provides application of the fiber optic image inverter with ultra-short twister in a low-light-level image intensifier.

A composition for a surrounding pipe fiber is composed of the following components by mole percentage content:

| | |
|---|---|
| $SiO_2$ | 78.1-80.0% |
| $Al_2O_3$ | 3.1-7.0% |
| $B_2O_3$ | 2.0-8.0% |
| $Li_2O$ | 0-1.0% |
| $Na_2O$ | 0-2.9% |
| $K_2O$ | 5.1-10.0% |
| CaO | 1.1-3.0% |
| SrO | 0-1.0% |
| ZnO | 1.1-2.0% |
| $TiO_2$ | 0-1.0% |
| $CeO_2$ | 0.05-0.2% |
| $MgF_2$ | 0-2.0% |
| $CaF_2$ | 0.05-2.0% |

A composition for a surrounding pipe fiber is composed of the following components by mole percentage content:

| | |
|---|---|
| $SiO_2$ | 78.2-79.5% |
| $Al_2O_3$ | 3.5-6.5% |
| $B_2O_3$ | 3.0-5.5% |
| $Li_2O$ | 0.1-1.0% |
| $Na_2O$ | 0.1-2.9% |
| $K_2O$ | 6.7-10.0% |
| CaO | 1.1-3.0% |
| SrO | 0.1-1.0% |
| ZnO | 1.1-2.0% |
| $TiO_2$ | 0.01-1.0% |
| $CeO_2$ | 0.05-0.2% |
| $MgF_2$ | 0.05-2.0% |
| $CaF_2$ | 0.05-2.0% |

A glass composition of the surrounding pipe fiber of the cladding glass pipe provided by the present application is composed of a $SiO_2$—$Al_2O_3$—$B_2O_3$—RO—$R_2O$ glass system, a certain quantity of $Al_2O_3$ is introduced for improving the strain point temperature of the glass, so as to improve a tensile strength of an edge fiber of the fabricated fiber optic image inverter with ultra-short twister after a twisting area is compressed, and it is guaranteed that the edge fiber of the fiber optic image inverter with ultra-short twister does not break after the twisting area is compressed and occurrence of a spot defect or reduction of the resolution at edge will be avoided; an alkali earth metal oxide RO and an alkaline metal oxide $R_2O$ are introduced for improving devitrification resistance and a high-temperature viscosity characteristic of the glass; $CeO_2$ is introduced as a glass fining agent so as to eliminate internal bubbles in the glass; a certain quantity of ZnO and $TiO_2$ is introduced for adjusting viscosity of the glass, and a design of multi-component oxides can effectively improve the devitrification resistance of the glass; and in addition, a refractive index of the glass is improved by introducing a certain quantity of fluorides, and finally, a glass consist which meets the requirement of fabrication of the fiber optic image inverter with ultra-short twister is obtained.

Glass of the surrounding pipe fiber has a refractive index ranging from 1.48 to 1.51; and a mean linear thermal expansion coefficient is $(80\pm5)\times10^{-7}/°$ C. within a temperature range from 30° C. to 300° C., and a long enough viscosity range is achieved; the glass of the surrounding pipe fiber has a strain point temperature ranging from 580° C. to 620° C., an expansion softening temperature ranging from 680° C. to 710° C. and a temperature ranging from 780° C. to 810° C. in the viscosity of $10^{7.6}$ dPa·s, and has neither devitrification nor phase separation after being subjected to heat preservation for 6 hours at a temperature ranging from 850° C. to 900° C., so the devitrification resistance is good. A glass material of the surrounding pipe fiber and a glass material of core glass rod have the same temperature at a torsion viscosity point of $10^{7.6}$ dPa·s, which facilitates compression of the twisting area of the fiber optic image inverter, and the resolution at edge is not reduced after the twisting area is compressed.

In the glass composition of the surrounding pipe fiber in the present application, $SiO_2$ serves as a main body of a glass forming structure network and is a component playing a main role in the glass structure network. $SiO_2$ has a mole percentage ranging from 78.1 mol. % to 80.0 mol. %; if a $SiO_2$ content is lower than 78.1 mol. %, the glass with the low refractive index is not easy to obtain, and chemical stability of the glass will be reduced; and if the $SiO_2$ content is higher than 80.0 mol. %, high-temperature viscosity of the glass will be increased, which causes too high glass melting temperature and too high fabrication cost of the glass and does not facilitate glass production.

$Al_2O_3$ belongs to an intermediate oxide of the glass, and $Al^{3+}$ has two coordination states in the glass, that is, located in a tetrahedron or an octahedron; when there is enough oxygen in the glass, an aluminum-oxygen tetrahedron [$AlO_4$] is formed and forms a continuous network with a silicon-oxygen tetrahedron; and when there is no enough oxygen in the glass, an aluminum-oxygen octahedron [AlO₆] is formed and serves as a network modifier to be located in a cavity of a silicon-oxygen structure network, which may become a glass network forming main body like $SiO_2$ within a certain content range. $Al_2O_3$ has a mole percentage ranging from 3.1 mol. % to 7.0 mol. %, preferably, 3.5 mol. % to 6.5 mol. %, and $Al_2O_3$ can significantly improve the strain point temperature of the glass material and is a main component for solving the problem of the resolution loss at edge of the fiber optic image inverter with ultra-short twister; when an $Al_2O_3$ content is lower than 3.1 mol. %, brittleness of the glass may be increased, the strain point temperature of the glass is not high enough, tensile deformation of the glass fiber is not facilitated, and the resolution at edge of the fabricated fiber optic image inverter with ultra-short twister will be reduced; and when the $Al_2O_3$ content is greater than 7.0 mol. %, a melting temperature of the glass is increased remarkably, in addition, the high-temperature viscosity of the glass is increased significantly, the mono fiber is elliptical when drawn, roundness of the mono fiber cannot be controlled, and make against to the optical fiber drawing and the fiber diameter controlling.

$B_2O_3$ serves as a glass forming oxide, also as a component for constituting the glass structure network and meanwhile as a fluxing agent for reducing glass melting viscosity. A boron-oxygen triangle [BO₃] and a boron-oxygen tetrahedron [BO₄] are structural components; boron may exist as the triangle [BO₃] or the boron-oxygen tetrahedron [BO₄] under different conditions; the boron-oxygen tetrahedron is usually difficult to form under a high-temperature melting condition, which may exist only in the form of a trihedron, however, $B^{3+}$ has a tendency to capturing free oxygen and forming a tetrahedron under a certain condition at a low temperature, so a structure is compact and low-temperature viscosity of the glass is improved, but due to the characteristic of reducing the glass viscosity at a high temperature and improving the glass viscosity at the low temperature, and it is also a main component for reducing the glass refractive index, both of which determine that the content range of $B_2O_3$ is relatively small. $B_2O_3$ has a mole percentage ranging from 2.0 mol. % to 8.0 mol. %; if a $B_2O_3$ content is lower than 2.0 mol. %, an effect of fluxing cannot be achieved, and in addition, chemical stability of the glass will be reduced; and if the $B_2O_3$ content is greater than 8.0 mol. %, the strain point temperature of the glass will be reduced, glass fluidity is prolonged, and make against to the optical fiber drawing and the fiber diameter controlling, meanwhile the phase separation tendency of the glass will be increased.

$Li_2O$ is an alkali metal oxide and is a network modifier oxide of the glass structure, $Li_2O$ has a mole percentage ranging from 0 to 1.0 mol. %, and plays a main role in reducing the glass melting viscosity, and if a $Li_2O$ content is greater than 1.0 mol. %, a glass tendency to devitrification will be increased.

$Na_2O$ is an alkali metal oxide and is a network modifier oxide of the glass structure, $Na_2O$ has a mole percentage ranging from 0 to 2.9 mol. %, and if a $Na_2O$ content is greater than 2.9 mol. %, a refractive index and a thermal expansion coefficient of the glass will be increased, and the glass tendency to devitrification will be increased.

$K_2O$ is an alkali metal oxide and is a network modifier oxide of the glass structure, $K_2O$ has a mole percentage content ranging from 5.1 mol. % to 10.0 mol. %, and preferably, 7.1 mol. % to 10.0 mol. %; if the $K_2O$ content is less than 5.1 mol. %, an effect of adjusting the glass high-temperature melting viscosity cannot be achieved; and if the $K_2O$ content is greater than 10.0 mol. %, the refractive index and the thermal expansion coefficient of the glass will be increased, and the glass tendency to devitrification will be increased.

CaO is an alkaline earth metal oxide and is a network modifier oxide of the glass structure, CaO has a mole percentage ranging from 1.1 mol. % to 3.0 mol. %, and if a CaO content is greater than 3.0 mol. %, chemical stability of the glass will be reduced, and the glass tendency to devitrification will be increased.

SrO is an alkaline earth metal oxide and is a network modifier oxide of the glass structure, SrO has a mole percentage ranging from 0 to 1.0 mol. %, and if a SrO content is greater than 1.0 mol. %, the chemical stability of the glass will be reduced, and the glass tendency to devitrification will be increased.

ZnO is used for reducing the melting temperature of the glass, ZnO has a mole percentage ranging from 1.1 mol. % to 2.0 mol. %, and if a ZnO content is greater than 2.0 mol. %, the chemical stability of the glass will be reduced, and the refractive index of the glass and the glass tendency to devitrification will be increased.

$TiO_2$ is presented in two valence states of $Ti^{3+}$ and $Ti^{4+}$ in a glass melt and usually exists in a valence state of $Ti^{4+}$ in a silicate glass, in this case, a 3d track is empty, "d-d" transition between electrons in a d track cannot occur, so the $Ti^{4+}$ valence state is colorless in the glass, however, as $Ti^{4+}$ can absorb ultraviolet rays intensively and its absorption band may usually enter a purple blue portion of a visible light area, which results in that the glass actually presents brown yellow, especially, $Ti^{4+}$ has an effect of enhancing coloring of a transition element, which results in that though a small quantity of transition elements is contained in a glass raw material, the obtained glass still presents a dark color, and this effect is especially evident for an iron element. $TiO_2$ has a mole percentage ranging from 0 to 1.0% and is used for adjusting the refractive index and the transmittance of the glass, and if a $TiO_2$ content is greater than 1.0 mol. %, the transmittance of the glass will be reduced, and the refractive index of the glass will be increased.

$CeO_2$ is a glass fining agent and has a mole percentage ranging from 0.05 mol. % to 0.2 mol. %, and if a $CeO_2$ content is greater than 0.2 mol. %, the transmittance of the glass will be reduced, and the glass tendency to devitrification will be increased.

$MgF_2$ and $CaF_2$ are used for adjusting characteristics of the refractive index and the high-temperature viscosity of the glass; $MgF_2$ has a mole percentage ranging from 0 to 2.0 mol. %, and if a $MgF_2$ content is greater than 2.0 mol. %, the glass tendency to devitrification will be increased; and a $CaF_2$ content ranges from 0.05 mol. % to 2.0 mol. %, and if a $CaF_2$ content is greater than 2.0 mol. %, it is not good for eliminating small bubbles in a glass melt, and the glass tendency to devitrification will be increased.

The surrounding pipe fiber glass in the present application belongs to the silicate glass, the glass does not contain oxides of variable-valence elements, such as $As_2O_3$, PbO, BaO and $Fe_2O_3$, though a very small quantity of them is contained, they are brought by other glass raw materials, however, the contents of these variable-valence elements are strictly controlled to be 1 ppm or below when the glass raw materials are introduced.

The surrounding pipe fiber is arranged on the periphery of the cladding glass pipe, the fabricated fiber optic image inverter with ultra-short twister has the characteristics of high viscosity and high strain point temperature, the resolution at edge of the fabricated fiber optic image inverter with ultra-short twister is not reduced, fewer spot defects exist, and the resolution and transmittance uniformity at edge are good.

Components of the surrounding pipe fiber glass and the cladding glass pipe are different, and the strain point temperature of the surrounding pipe fiber glass is obviously higher than that of the cladding glass pipe. In this way, it is good for enhancing a tensile deformation strength of a cladding of the optical fiber, so the optical fiber cladding glass is not prone to breaking after the twisting area is compressed, and a total reflection structure of the optical fiber may be guaranteed.

The glass of the surrounding pipe fiber and glass of core glass rod have the same temperature at a torsion viscosity point of $10^{7.6}$ dPa·s, so it facilitates compression of the twisting area of the fiber optic image inverter, and the fiber optic image inverter with ultra-short twister with the qualified performance index will be fabricated. If the glass of the surrounding pipe fiber and the glass of core glass rod have different temperatures at the torsion viscosity point of $10^{7.6}$ dPa·s, or the temperatures in the torsion viscosity point deviate largely, the resolution at edge of the fabricated fiber optic image inverter will be reduced after the twisting area is compressed, and an effect of the resolution at edge being greater than 110 lp/mm cannot be achieved.

A composition for the filling glass fiber is composed of the following components by mole percentage content:

| | |
|---|---|
| $SiO_2$ | 15.0-25.0% |
| $Al_2O_3$ | 0-0.5% |
| $B_2O_3$ | 20.0-30.0% |
| MgO | 1.01-2.0% |
| SrO | 1.0~5.0% |
| BaO | 15.0-25.0% |
| ZnO | 0.5-2.0% |
| $SnO_2$ | 0.1-0.2% |
| $TiO_2$ | 5.0-9.0% |
| $WO_3$ | 1.0-5.0% |
| $La_2O_3$ | 5.0-10.0% |
| $Nb_2O_5$ | 1.0-5.0% |
| $Y_2O_3$ | 0.5-2.0% |
| $Ta_2O_5$ | 1.1-5.0% |
| $Gd_2O_3$ | 0-0.9% |

A composition for the filling glass fiber is composed of the following components by mole percentage content:

| | |
|---|---|
| $SiO_2$ | 19.0-25.0% |
| $Al_2O_3$ | 0.1-0.5% |
| $B_2O_3$ | 25.0-30.0% |
| MgO | 1.01-2.0% |
| SrO | 1.0-5.0% |
| BaO | 15.0-25.0% |
| ZnO | 0.5-2.0% |
| $SnO_2$ | 0.1-0.2% |
| $TiO_2$ | 5.0-9.0% |
| $WO_3$ | 1.0-5.0% |
| $La_2O_3$ | 5.0-9.0% |
| $Nb_2O_5$ | 1.0-5.0% |
| $Y_2O_3$ | 0.5-2.0% |
| $Ta_2O_5$ | 1.1-5.0% |
| $Gd_2O_3$ | 0.1-0.9% |

The present application further provides a glass composition of a filling glass fiber filled and inserted into the hole of the multi assembly rod, and a refractive index of the glass composition ranges from 1.80 to 1.82; a mean linear thermal expansion coefficient is $(90\pm5)\times10^{-7}/°$ C. within a range of 30° C. to 300° C., the strain point temperature of the glass of the filling glass fiber ranges from 610° C. to 630° C., the transmittance of the glass is greater than 95% within a spectrum of 400 nm to 700 nm, the glass has neither devitrification nor phase separation after being subjected to heat preservation for 6 hours at a temperature ranging from 850° C. to 900° C., and the devitrification resistance is good.

In the composition of the filling glass fiber in the present application, $SiO_2$ serves as a main body of a glass forming structure network and is a component playing a main role in the glass structure network. $SiO_2$ has a mole percentage (mol. %) ranging from 15.0 mol. % to 25.0 mol. %. If a $SiO_2$ content is lower than 15.0 mol. %, the glass with a high refractive index is not easy to obtain, and the chemical stability of the glass is reduced; and if the $SiO_2$ content is higher than 25.0 mol. %, the high-temperature viscosity of the glass will be increased, the resulting glass melting temperature is too high, and the thermal expansion coefficient of the glass will be reduced.

$Al_2O_3$ belongs to the intermediate oxide of the glass, and $Al^{3+}$ has two coordination states in the glass, namely, located in the tetrahedron or the octahedron; when there is enough oxygen in the glass, the aluminum-oxygen tetrahedron $[AlO_4]$ is formed and forms the continuous network with the silicon-oxygen tetrahedron; and when there is no enough oxygen in the glass, the aluminum-oxygen octahedron $[AlO_6]$ is formed and serves as the network modifier to be located in the cavity of the silicon-oxygen structure network, which may become the glass network forming main body like the $SiO_2$ within a certain content range. $Al_2O_3$ has a mole percentage ranging from 0 to 0.5 mol. %, and optionally, 0.1 mol. % to 0.5 mol. %; when an $Al_2O_3$ content is greater than 0.5 mol. %, the melting temperature of the glass may be increased significantly, and the high-temperature viscosity of the glass is increased substantially.

$B_2O_3$ serves as a glass forming oxide, also as a component for constituting the glass structure network and meanwhile as a fluxing agent for reducing glass melting viscosity. A boron-oxygen triangle $[BO_3]$ and a boron-oxygen tetrahedron $[BO_4]$ are structural components; boron may exist as the triangle $[BO_3]$ or the boron-oxygen tetrahedron $[BO_4]$ under different conditions; the boron-oxygen tetrahedron is usually difficult to form under a high-temperature melting condition, which may exist only in a mode of a trihedron, however, $B^{3+}$ has a tendency to capturing free oxygen and forming a tetrahedron under a certain condition at a low temperature, so a structure is compact and low-temperature viscosity of the glass is improved, but due to the characteristic of reducing the glass viscosity at a high temperature and improving the glass viscosity at the low temperature, it is also a main component for reducing the glass refractive index. $B_2O_3$ has a mole percentage (mol. %) ranging from 20.0 mol. % to 30.0 mol. %; if a $B_2O_3$ content is lower than 20.0 mol. %, an effect of fluxing cannot be achieved, and the chemical stability of the glass will be reduced; and if the $B_2O_3$ content is greater than 30.0 mol. %, the glass refractive index will be reduced, and the glass tendency to phase separation is increased.

MgO is a network modifier oxide of the glass structure and has a mole percentage (mol. %) ranging from 1.01 mol. % to 2.0 mol. %, and if a MgO content is greater than 2.0 mol. %, the chemical stability of the glass will be reduced, and the thermal expansion coefficient of the glass is increased.

SrO is a network modifier oxide of the glass structure and has a mole percentage (mol. %) ranging from 1.0 mol. % to 5.0 mol. %, and if a SrO content is greater than 5.0 mol. %, the chemical stability of the glass will be reduced, and the thermal expansion coefficient of the glass is increased.

BaO is a network modifier oxide of the glass structure and can effectively improve the glass refractive index, and BaO has a mole percentage (mol. %) ranging from 15.0 mol. % to 25.0 mol. %; if a BaO content is less than 15.0 mol. %, the glass refractive index will be reduced remarkably; and if the BaO content is greater than 25.0 mol. %, a devitrification temperature of the glass will be increased, the glass tendency to devitrification is increased, and glass density will be improved significantly.

ZnO is an oxide for adjusting the glass melting temperature and the glass devitrification property, and ZnO has a mole percentage (mol. %) ranging from 0.5 mol. % to 2.0 mol. %; and if a ZnO content is greater than 2.0 mol. %, the chemical stability of the glass will be reduced, and the glass tendency to devitrification is increased.

$SnO_2$ is a glass fining agent and has a mole percentage (mol. %) ranging from 0.1 mol. % to 0.2 mol. %; if a $SnO_2$ content is greater than 0.2 mol. %, the glass tendency to devitrification will be increased.

$TiO_2$ is used for improving the refractive index and the transmittance of the glass and has a mole percentage (mol. %) ranging from 5.0 mol. % to 9.0 mol. %; and if a $TiO_2$ content is greater than 9.0 mol. %, the transmittance of the glass will be reduced.

$WO_3$ is an oxide used for adjusting the glass devitrification property and has a mole percentage (mol. %) ranging from 1.0 mol. % to 5.0 mol. %; and if a $WO_3$ content is greater than 5.0 mol. %, the glass tendency to devitrification will be increased.

$La_2O_3$ is a lanthanide-series rare earth oxide and can improve the glass refractive index, and $La_2O_3$ has a mole percentage (mol. %) ranging from 5.0 mol. % to 10.0 mol. %; and if a $La_2O_3$ content is greater than 10.0 mol. %, the thermal expansion coefficient of the glass will be increased.

$Nb_2O_5$ is also a rare earth oxide and can increase the glass refractive index, and $Nb_2O_5$ has a mole percentage (mol. %) ranging from 1.0 mol. % to 5.0 mol. %, but when a $Nb_2O_5$ content is greater than 5.0 mol. %, density and the thermal expansion coefficient of the glass will be increased.

$Y_2O_3$ is a lanthanide-series rare earth oxide, which can improve the glass refractive index, and is also an oxide used for adjusting the glass devitrification property, and $Y_2O_3$ has a mole percentage (mol. %) ranging from 0.5 mol. % to 2.0 mol. %, but when a $Y_2O_3$ content is greater than 2.0 mol. %, the thermal expansion coefficient of the glass will be increased.

$Ta_2O_5$ is also a rare earth oxide and can increase the glass refractive index, and $Ta_2O_5$ has a mole percentage (mol. %) ranging from 1.1 mol. % to 5.0 mol. %, but when a $Ta_2O_5$ content is greater than 5.0 mol. %, the density and the thermal expansion coefficient of the glass will be increased.

$Gd_2O_3$ is also a rare earth oxide, which can increase the glass refractive index and is also an oxide used for adjusting the glass devitrification property, and $Gd_2O_3$ has a mole percentage (mol. %) ranging from 0 to 0.9 mol. %, and when a $Gd_2O_3$ content is greater than 0.9 mol. %, the density and the thermal expansion coefficient will be increased.

The present application may select the filling glass fiber filled and inserted into the triangular hole to be triangular, the triangular filling glass fiber may prevent an internal fiber structure of the fiber optic image inverter with ultra-short twister from slipping shift, the stable total reflection structure of the optical fiber is maintained, meanwhile, useful luminous flux entering the optical fiber is increased greatly, and thus the transmittance and the transmittance uniformity of the fiber optic image inverter with ultra-short twister are improved.

A material of the filling glass fiber is different from components of the core glass, and the strain point temperature of the filling glass fiber is obviously higher than that of the core glass. In this way, it is good for enhancing the stability of the internal structure of the fiber optic image inverter, and a fiber structure of the optical fiber is not prone to slipping deformation after the twisting area is compressed, so as to guarantee the total reflection structure of the optical fiber.

A composition for the light absorption glass is composed of the following components by mole percentage content:

| | |
|---|---|
| $SiO_2$ | 71.0-80.0% |
| $Al_2O_3$ | 0.5-5.0% |
| $B_2O_3$ | 1.0-5.0% |
| $Na_2O$ | 1.0-11.0% |
| $K_2O$ | 6.0-11.0% |
| MgO | 0.1-2.0% |
| CaO | 0.1-2.0% |
| BaO | 0-0.04% |
| $TiO_2$ | 0-1.0% |
| $Co_2O_3$ | 0.1-0.4% |
| NiO | 0.1-1.0% |
| MnO | 1.0-5.0% |
| $V_2O_3$ | 0.1-1.0% |
| $CeO_2$ | 0-0.2% |
| CuO | 0-0.05% |

A composition for the light absorption glass is composed of the following components by mole percentage content:

| | |
|---|---|
| $SiO_2$ | 74.0-80.0% |
| $Al_2O_3$ | 1.5-5.0% |
| $B_2O_3$ | 1.0-5.0% |
| $Na_2O$ | 5.1-11.0% |
| $K_2O$ | 8.1-11.0% |
| MgO | 0.1-2.0% |
| CaO | 0.1-2.0% |
| BaO | 0.01-0.04% |
| $TiO_2$ | 0.01-1.0% |
| $Co_2O_3$ | 0.1-0.4% |
| NiO | 0.1-1.0% |
| MnO | 1.0-5.0% |
| $V_2O_3$ | 0.1-1.0% |
| $CeO_2$ | 0.01-0.2% |
| CuO | 0.01-0.05% |

Fluorescent powder adopted for a fluorescent screen used for a low-light-level night vision device has a wavelength ranging from 510 nm to 560 nm, green light wavelength prevails, the light absorption glass in the present application has strong and uniform light absorption capacity and a spectral absorption effect under a thickness of 0.5±0.01 mm and within a wavelength range of 510 nm to 660 nm, and has a spectrum transmittance less than or equal to 3.0%, and adjustment for the contrast of the fiber optic image inverter is good; the characteristics of the thermal expansion coefficient and the viscosity similar to the cladding glass are achieved, and the light absorption glass has a thermal expansion coefficient of $(85\pm5)\times10^{-7}/°$ C.; and the chemical stability and the devitrification resistance are good, the light absorption glass has neither devitrification nor phase separation after being subjected to heat preservation at a temperature ranging from 850° C. to 900° C. for 6 hours, and the devitrification resistance and the chemical stability are good.

In the composition for the light absorption glass in the present application, $SiO_2$ is a main body of a glass forming structure network and a component playing a main role in the glass structure network. $SiO_2$ has a mole percentage (mol. %) ranging from 71.0 mol. % to 80.0 mol. %. If the $SiO_2$ content is lower than 71.0 mol. %, the thermal expansion coefficient similar to the cladding glass is not easy to obtain, and the chemical stability of the glass will be reduced; and if the $SiO_2$ content is high than 80.0 mol. %, the high-temperature viscosity of the glass will be increased, and the resulting glass melting temperature is too high.

$Al_2O_3$ belongs to the intermediate oxide of the glass, and $Al^{3+}$ has two coordination states, namely, located in the tetrahedron or the octahedron; when there is enough oxygen in the glass, the aluminum-oxygen tetrahedron $[AlO_4]$ is formed and forms the continuous network with the silicon-oxygen tetrahedron; and when there is no enough oxygen in the glass, the aluminum-oxygen octahedron $[AlO_6]$ is formed and serves as the network modifier to be located in the cavity of the silicon-oxygen structure network, which may become the glass network forming main body like the $SiO_2$ within a certain content range. $Al_2O_3$ has a mole percentage (mol. %) ranging from 0.5 mol. % to 5.0 mol. %, and if an $Al_2O_3$ content is greater than 5.0 mol. %, the high-temperature viscosity of the glass will be increased significantly, and the melting temperature of the glass will be increased.

$B_2O_3$ serves as a glass forming oxide, also as a component for constituting the glass structure network and meanwhile as a fluxing agent for reducing glass melting viscosity. The boron-oxygen triangle $[BO_3]$ and the boron-oxygen tetrahedron $[BO_4]$ are structural components; boron may exist as the triangle $[BO_3]$ or the boron-oxygen tetrahedron $[BO_4]$ under different conditions; the boron-oxygen tetrahedron is usually difficult to form under the high-temperature melting condition, which may exist only in a mode of a trihedron, however, $B^{3+}$ has a tendency to capturing free oxygen and forming the tetrahedron under a certain condition at the low temperature, so the structure is compact and the low-temperature viscosity of the glass is improved, but due to the characteristic of reducing the glass viscosity at the high temperature and improving the glass viscosity at the low temperature, it is also a main component for reducing the glass refractive index and thus its content range is to be small. $B_2O_3$ has a mole percentage (mol. %) ranging from 1.0 mol. % to 5.0 mol. %, and if a $B_2O_3$ content is greater than 5.0 mol. %, the glass tendency to phase separation will be increased.

$Na_2O$ is a network modifier oxide of the glass structure and has a mole percentage (mol. %) ranging from 1.0 mol. % to 11.0 mol. %, and if a $Na_2O$ content is greater than 11.0 mol. %, the thermal expansion coefficient of the glass will be increased.

$K_2O$ is a network modifier oxide of the glass structure and has a mole percentage (mol. %) ranging from 6.0 mol. % to 11.0 mol. %, and if a $K_2O$ content is greater than 11.0 mol. %, the thermal expansion coefficient of the glass will be increased.

MgO is a network modifier oxide of the glass structure and is used for adjusting the glass devitrification temperature, MgO has a mole percentage (mol. %) ranging from 0.1 mol. % to 2.0 mol. %, and if a MgO content is greater than 2.0 mol. %, the glass tendency to devitrification will be increased.

CaO is a network modifier oxide of the glass structure and has a mole percentage (mol. %) ranging from 0.1 mol. % to 2.0 mol. %, and if a CaO content is greater than 2.0 mol. %, the chemical stability of the glass will be reduced and the glass tendency to devitrification will be increased.

BaO is a network modifier oxide of the glass structure and is used for adjusting the glass devitrification temperature, BaO has a mole percentage (mol. %) ranging from 0 to 0.04 mol. %, and if a BaO content is greater than 0.04 mol. %, the chemical stability of the glass will be reduced and the glass tendency to devitrification will be increased.

$TiO_2$ is used for adjusting the chemical stability and devitrification property of the glass and has a mole percentage (mol. %) ranging from 0 to 1.0 mol. %, and if a $TiO_2$ content is greater than 1.0 mol. %, the chemical resistance of the glass will be reduced and the tendency to devitrification will be increased.

$Co_2O_3$ is a coloring agent of the light absorption glass and has a mole percentage (mol. %) ranging from 0.1 mol. % to 0.4 mol. %, $Co_2O_3$ has a lower melting point than CoO, so that $Co_2O_3$ can be combined with other coloring ions to form a stable form in the glass, and thus a light absorption material is colored more stably. When the $Co_2O_3$ content is greater than 0.4 mol. %, the chemical stability of the glass will be reduced, and the glass tendency to devitrification will be increased.

NiO is a coloring agent of the light absorption material glass and has a mole percentage (mol. %) ranging from 0.1 mol. % to 1.0 mol. %, $Ni^{2+}$ has a good absorption effect in a visible light area, and if the NiO content is greater than 1.0 mol. %, the chemical stability of the glass will be reduced and the glass tendency to devitrification will be increased.

MnO is a coloring agent of the light absorption glass, in the present application, MnO is a light absorber playing a main role, MnO has a higher melting point temperature than $MnO_2$, $Mn^{2+}$ has a stable light absorption capacity between 400 nm and 700 nm and can form a stable color in the glass, MnO has a mole percentage (mol. %) ranging from 1.0 mol. % to 5.0 mol. %, and if a MnO content is greater than 5.0 mol. %, the chemical stability of the glass will be reduced and the glass tendency to devitrification will be increased.

$V_2O_5$ is a coloring agent of the light absorption glass and has a mole percentage (mol. %) ranging from 0.1 mol. % to 1.0 mol. %, and $V_2O_5$ can secure coloring of manganese ions, so that coloring of the light absorption material is more stable. When the $V_2O_5$ content is greater than 1.0 mol. %, the chemical stability of the glass will be reduced, and the glass tendency to devitrification will be increased.

$CeO_2$ is a rare earth oxide, mainly adjusts the devitrification property of the glass and plays a role as a glass fining agent, $CeO_2$ has a mole percentage (mol. %) ranging from 0 to 0.2 mol. %, and when a $CeO_2$ content is greater than 0.2 mol. %, the glass tendency to devitrification will be increased.

CuO is a coloring agent of the light absorption glass, can be combined with $Ni^{2+}$, $Co^{3+}$, $Mn^{2+}$ and the like and forms a stable color in the glass, it may be guaranteed that stray light within a wavelength range from 400 nm to 700 nm is absorbed by a composite absorption effect, a good light absorption effect is obtained, a light absorption curve does not have an evident transmission peak in the visible light area, CuO has a mole percentage (mol. %) ranging from 0 to 0.05 cmol. %, but if a CuO content is greater than 0.05 mol. %, the glass tendency to devitrification will be increased.

The light absorption material glass of the present application is applied to the fiber optic image inverter with ultra-short twister, which can effectively improve absorption of stray light between the optical fibers so as to reduce optical crosstalk between the fibers, and thus an effect of improving the contrast and the definition of imaging of the fiber optic image inverter is achieved. Imaging uniformity of the fiber optic image inverter can be effectively improved by using a light absorption material casing pipe technology.

The light absorption material glass of the present application may be applied to the fiber optic image inverter with ultra-short twister, and the fiber optic image inverter with ultra-short twister may be applied to the low-light-level image intensifier.

Specifically, the present application further provides application of the fiber optic image inverter with ultra-short twister fabricated by the method in a low-light-level image intensifier. The fiber optic image inverter with ultra-short twister of the present application may be applied to a helmet night-vision device.

Compared with the prior art, the fiber optic image inverter with ultra-short twister fabricated by the present application has the following advantages.

(1) The fiber optic image inverter with ultra-short twister has an overall height not more than 15 mm and a weight less than 20 g.
(2) The optical crosstalk of the fiber optic image inverter with ultra-short twister at a position 0.1 mm away from a cutter edge is less than 1.0%.
(3) The fiber optic image inverter with ultra-short twister has a fiber diameter not more than 4.0 micrometers, a center resolution greater than 140 lp/mm and a resolution at edge greater than 110 lp/mm.
(4) The fiber optic image inverter with ultra-short twister has a transmittance greater than 70% within a wavelength range from 400 nm to 700 nm.
(5) The fiber optic image inverter with ultra-short twister has a good fixed-pattern noise property and has no obvious multifiber boundary after being observed under a 10× microscope.

The fiber optic image inverter with ultra-short twister of the present application has advantages of good light transmission uniformity, high resolution, high contrast and clear imaging, and the fiber optic image inverter with ultra-short twister of the present application is applied to the low-light-level image intensifier, which can effectively reduce a size and a weight of a low-light-level image tube and improve imaging definition of the helmet night-vision device.

In the accompanying drawings:
1: cladding glass pipe, 2: surrounding pipe fiber, 3: filling glass fiber, 4: casing pipe absorption fiber, 5: core glass fiber, and 6: cladding glass surrounded with a fiber;
601: low-light-level image intensifier, 602: fiber optic image inverter with ultra-short twister, 603: image under a low-light level, and 604: intensified image;
701: helmet night-vision device, 702: helmet, and 703: wearer; and
801: ultra-short high-temperature twisting furnace, 802: heating body in the ultra-short high-temperature heating furnace, and 803: fiber optic image inverter block.

DETAILED DESCRIPTION

In order to make objectives, technical solutions and advantages of the present application clearer, implementations of the present application will be further described in detail below. The present application is further described in detail below with reference to the accompanying drawings and the specific implementations, which does not serve as a limitation on the present application.

Figure 1:
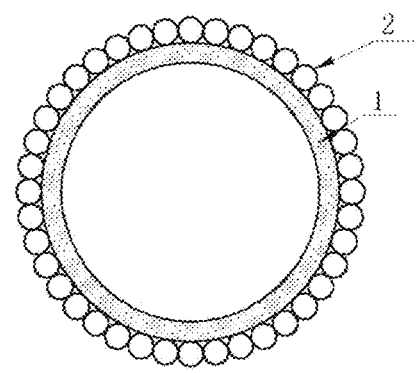
FIG. 1 is a schematic diagram of arranging a surrounding pipe fiber on an outer layer of a cladding glass pipe provided by an embodiment of the present application.

Referring to FIG. 1, an outer side of a cladding glass pipe 1 is uniformly surrounded with a surrounding pipe fiber 2, a core glass fiber 5 is inserted into the cladding glass pipe 1, and the above matching rod-pipe combined body is drawn into a mono fiber.

Figure 2:
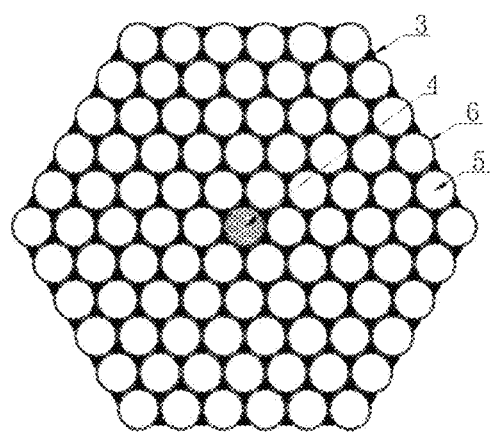
FIG. 2 is a schematic diagram of a multi fiber of a fiber optic image inverter with ultra-short twister provided by an embodiment of the present application.

Referring to FIG. 2, the core glass fiber 5 is arranged in cladding glass 6 surrounded with the fiber to form the mono fiber; the mono fibers are arranged into a multi assembly rod with a hexagonal cross section according to six mono fibers on each side, then a mono fiber arranged at a very center of the hexahedron multi assembly rod is replaced with the casing pipe absorption fiber 4, and a triangular filling glass fiber 3 is filled and inserted into a triangular hole of the multi assembly rod; and the above multi assembly rod obtained after combination is drawn into the multi fiber as shown in FIG. 2.

Figure 3:
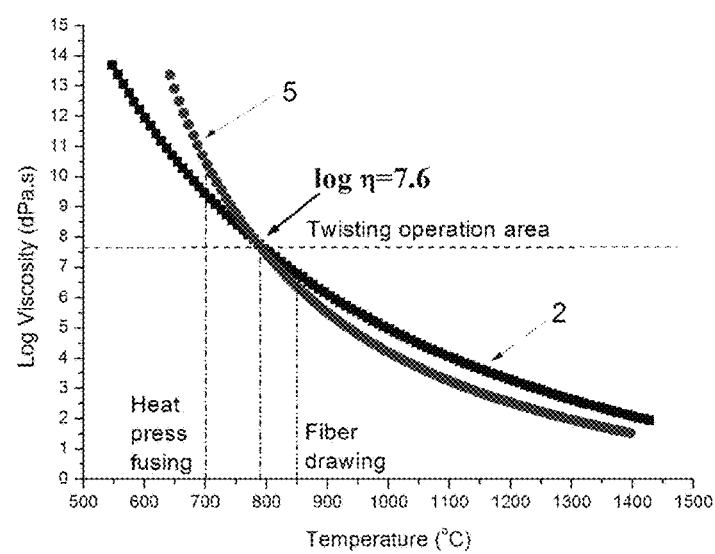
FIG. 3 is a viscosity fitting curve of core glass and surrounding pipe fiber glass provided by an embodiment of the present application.

Referring to FIG. 3, in FIG. 3, the high-temperature viscosity fitting curve of glass of the surrounding pipe fiber 2 and the core glass fiber 5 have the same temperature at a torsion viscosity point of $10^{7.6}$ dPa·s, so that the resolution at edge of a fabricated fiber optic image inverter with ultra-short twister can be greater than 110 lp/mm.

Figure 4:
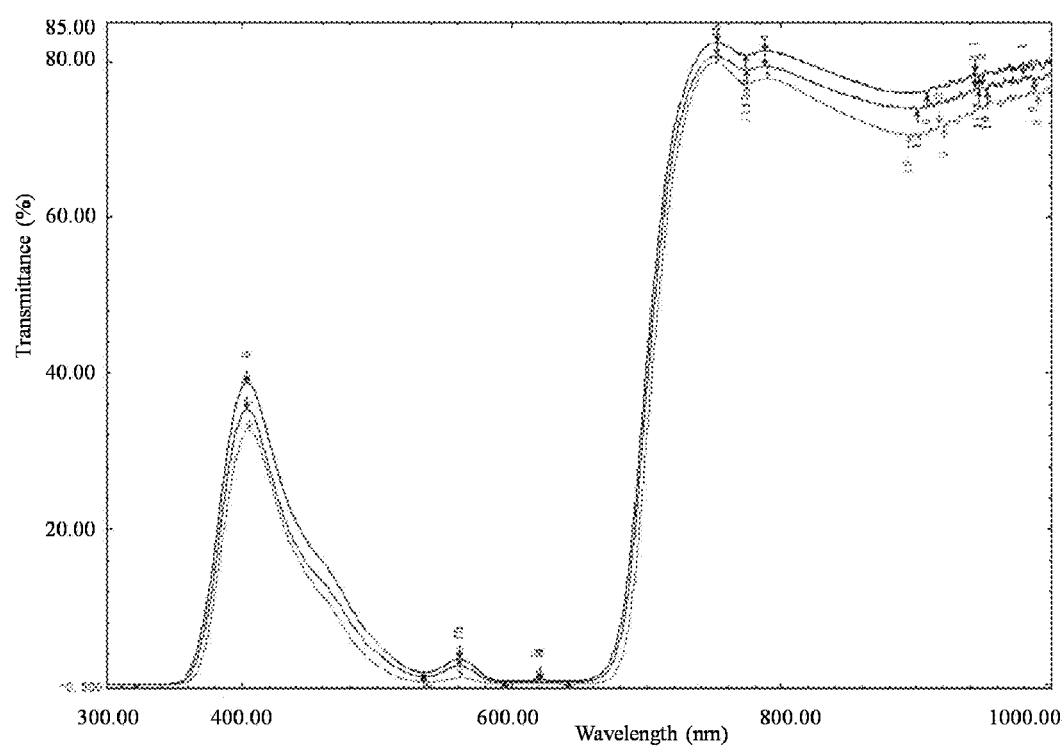
FIG. 4 is a transmittance curve of light absorption glass provided by an embodiment of the present application.

Referring to FIG. 4, which is a transmittance curve of a light absorption material, it can be seen that the light absorption ability and the spectral absorption effect are strong and uniform within a wavelength range from 510 nm to 660 nm, a spectrum transmittance is less than or equal to 3.0%, and thus the contrast of the fabricated fiber optic image inverter with ultra-short twister can be less than or equal to 1.0%.

Figure 5:
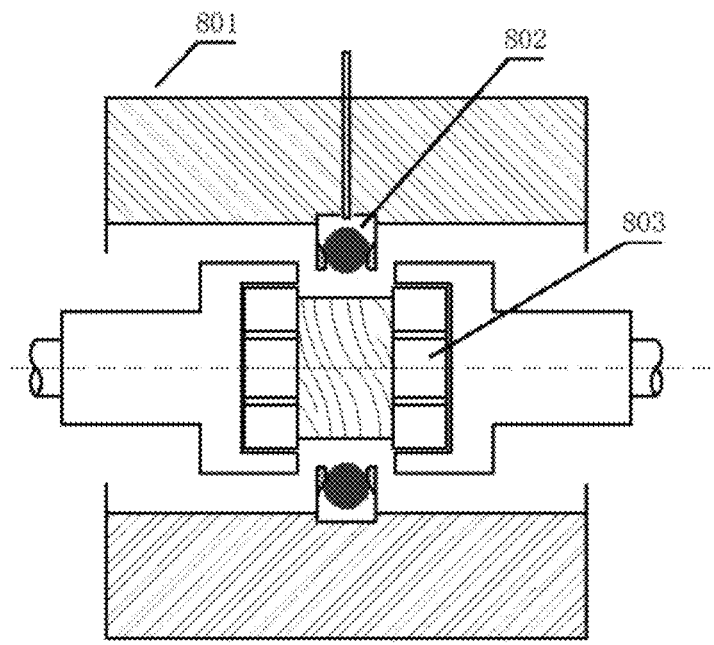
FIG. 5 is a schematic diagram of an ultra-short high-temperature twisting heating furnace provided by an embodiment of the present application.

Referring to FIG. 5, which is a schematic diagram of an ultra-short high-temperature twisting heating furnace, heating body in the ultra-short high-temperature heating furnace 802 is arranged in the twisting furnace 801, a fiber optic image inverter block 803 is subjected to 180° twisting operation after being heated by the heating body in the ultra-short high-temperature heating furnace 802 in the ultra-short high-temperature twisting furnace 801, and the fiber optic image inverter with ultra-short twister is obtained.

Figure 6:
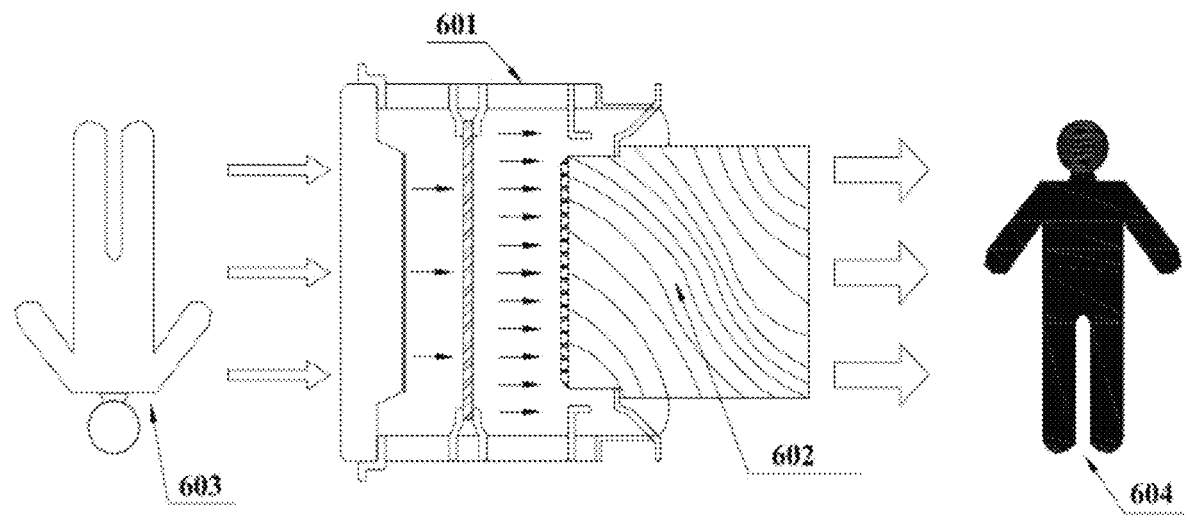
FIG. 6 is a schematic diagram of application of a fiber optic image inverter with ultra-short twister in a low-light-level image intensifier provided by an embodiment of the present application.

Referring to FIG. 6, which is application of the fiber optic image inverter with ultra-short twister in a low-light-level image intensifier, the fiber optic image inverter with ultra-short twister 602 fabricated by the present application is applied to the low-light-level image intensifier 601, and an image 603 under a low-light level can be transformed into an intensified image 604 by using the low-light-level image intensifier 601.

Figure 7:
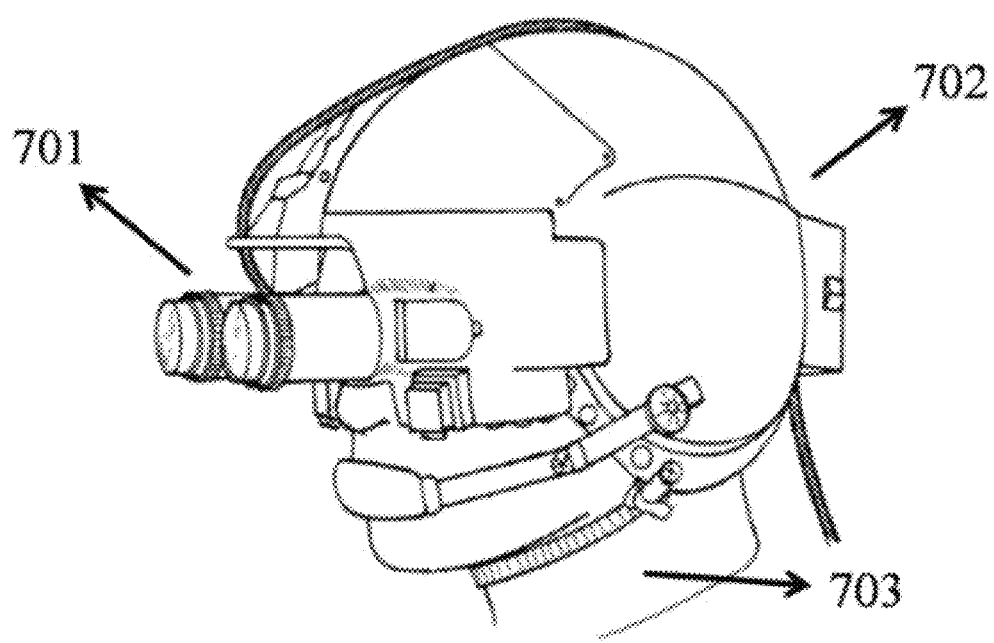
FIG. 7 is a schematic diagram of application of a fiber optic image inverter with ultra-short twister in a low-light-level image intensifier and then in a helmet night-vision device provided by an embodiment of the present application.

Referring to FIG. 7, which is application of the fiber optic image inverter with ultra-short twister in a helmet night-vision device, the fiber optic image inverter with ultra-short twister 602 fabricated by the present application is applied to the low-light-level image intensifier 601, and finally the helmet night-vision device 701 is fabricated and mounted in a helmet 702, and a wearer 703 wears the helmet for use.

All "mole percentages mol. %" herein are based on an integral mole quantity of a final glass composition. Parameters measured for high-refractive index filling glass used for a fiber optic image element in the present application, measurement methods and instruments are as follows.

(1) Refractive index np is a refractive index of glass when $\lambda=589.3$ nm, which is measured by using a refractometer.

(2) A mean linear thermal expansion coefficient $\alpha_{30/300}$ [$\times 10^{-7}/°$ C.] at a temperature ranging from 30° C. to 300° C. is measured by using a horizontal dilatometer and measured by a method specified in GB/T 16920-2015.

(3) The strain point temperature of the glass is measured by a bent beam method specified in GB/T 28196-2011.

(4) The transmittance of the glass is measured by a transmittance device.

Chemical compositions (mol. %) of the glass in embodiments are listed in details in Table 1, Table 2 and Table 3.

TABLE 1

Chemical compositions (mol. %) and properties of embodiments of the surrounding pipe fiber glass

| Composition (mol. %) | Embodiment 1 | Embodiment 2 | Embodiment 3 | Embodiment 4 | Embodiment 5 |
|---|---|---|---|---|---|
| $SiO_2$ | 78.30 | 78.40 | 80.00 | 78.20 | 78.10 |
| $Al_2O_3$ | 5.30 | 3.40 | 3.10 | 7.00 | 3.50 |
| $B_2O_3$ | 3.00 | 8.00 | 2.00 | 2.10 | 2.20 |
| $Li_2O$ | 0.10 | 0.20 | 1.00 | 0.11 | 0.10 |
| $Na_2O$ | 2.90 | 0.20 | 0.30 | 0.10 | 0.20 |
| $K_2O$ | 6.70 | 5.10 | 8.25 | 7.90 | 10.00 |
| CaO | 1.30 | 1.20 | 2.10 | 1.10 | 3.00 |
| SrO | 0.20 | 0.10 | 1.00 | 0.10 | 0.20 |
| ZnO | 1.10 | 1.27 | 1.10 | 1.12 | 2.00 |
| $TiO_2$ | 0.50 | 0.01 | 1.00 | 0.01 | 0.30 |
| $CeO_2$ | 0.09 | 0.06 | 0.05 | 0.20 | 0.10 |
| $MgF_2$ | 0.11 | 2.00 | 0.05 | 0.06 | 0.20 |
| $CaF_2$ | 0.40 | 0.06 | 0.05 | 2.00 | 0.10 |
| $\alpha_{30/300}$ [$10^{-7}/°$ C.] | 83 | 81 | 84 | 82 | 85 |
| Strain point temperature | 610 | 585 | 680 | 620 | 590 |
| Refractive index $n_D$ | 1.49 | 1.48 | 1.51 | 1.48 | 1.50 |

TABLE 2

Chemical compositions (mol. %) and properties of embodiments of the filling glass fiber

| Composition (mol. %) | Embodiment 1 | Embodiment 2 | Embodiment 3 | Embodiment 4 | Embodiment 5 |
|---|---|---|---|---|---|
| $SiO_2$ | 22.7 | 20.31 | 25.00 | 15.00 | 17.00 |
| $Al_2O_3$ | 0.1 | 0.15 | 0.25 | 0.50 | 0.30 |
| $B_2O_3$ | 26.8 | 24.33 | 20.00 | 28.60 | 30.00 |
| MgO | 1.01 | 1.16 | 1.65 | 2.00 | 1.85 |
| SrO | 3.4 | 3.7 | 1.00 | 4.20 | 5.00 |
| BaO | 16.2 | 21.85 | 25.00 | 15.00 | 24.10 |
| ZnO | 0.5 | 2.0 | 1.70 | 1.60 | 1.50 |
| $SnO_2$ | 0.1 | 0.16 | 0.20 | 0.14 | 0.18 |
| $TiO_2$ | 8.07 | 8.61 | 5.00 | 9.00 | 5.37 |
| $WO_3$ | 4.0 | 1.0 | 3.00 | 5.00 | 2.00 |
| $La_2O_3$ | 7.67 | 7.55 | 9.00 | 10.00 | 5.00 |
| $Nb_2O_5$ | 3.22 | 3.53 | 5.00 | 3.10 | 1.00 |
| $Y_2O_3$ | 0.5 | 1.42 | 1.20 | 1.80 | 2.00 |
| $Ta_2O_5$ | 5.0 | 4.13 | 1.10 | 3.26 | 4.00 |
| $Gd_2O_3$ | 0.73 | 0.1 | 0.90 | 0.80 | 0.70 |
| $\alpha_{30/300}$ [$10^{-7}/°$ C.] | 85 | 90 | 89 | 91 | 87 |
| Refractive index | 1.81 | 1.82 | 1.82 | 1.8 | 1.81 |

TABLE 3

Chemical compositions (mol. %) and properties of embodiments of the light absorption glass

| Composition (mol. %) | Embodiment 1 | Embodiment 2 | Embodiment 3 | Embodiment 4 | Embodiment 5 |
|---|---|---|---|---|---|
| $SiO_2$ | 76.00 | 71.00 | 80.00 | 77.66 | 73.13 |
| $Al_2O_3$ | 2.00 | 1.93 | 0.50 | 1.27 | 5.00 |
| $B_2O_3$ | 3.50 | 5.00 | 3.04 | 1.00 | 1.82 |
| $Na_2O$ | 5.10 | 11.00 | 1.00 | 2.09 | 6.46 |
| $K_2O$ | 8.20 | 6.00 | 11.00 | 8.26 | 7.80 |
| MgO | 0.30 | 0.10 | 0.16 | 2.00 | 0.25 |
| CaO | 1.70 | 0.10 | 2.00 | 0.58 | 1.19 |
| BaO | 0.02 | 0.01 | 0.04 | 0.03 | 0.02 |
| $TiO_2$ | 0.02 | 0.14 | 0.01 | 0.73 | 1.00 |
| $Co_2O_3$ | 0.20 | 0.40 | 0.10 | 0.31 | 0.28 |
| NiO | 0.50 | 0.88 | 1.00 | 0.70 | 0.10 |
| MnO | 1.90 | 2.86 | 1.00 | 5.00 | 1.88 |
| $V_2O_3$ | 0.45 | 0.54 | 0.10 | 0.16 | 1.00 |
| $CeO_2$ | 0.06 | 0.02 | 0.01 | 0.20 | 0.04 |
| CuO | 0.05 | 0.02 | 0.04 | 0.01 | 0.03 |
| Visible light transmittance (0.5 mm in thickness) | 2.3% | 1.7% | 2.8% | 1.0% | 2.1% |
| $\alpha_{30/300}$ [$10^{-7}/°$ C.] | 83 | 87 | 81 | 83 | 85 |

Embodiment 1

A method for fabricating a fiber optic image inverter with ultra-short twister includes the following steps:

(1) surrounding pipe fiber drawing: a round glass rod with a low refractive index and a high strain point temperature is fabricated according to a glass composition in Embodiment 1 of Table 1, and the round glass rod is drawn into the surrounding pipe fiber of Φ1.8 mm;

(2) filling glass fiber drawing: a triangular glass rod with a high refractive index and a high transmittance is fabricated according to a glass composition of Embodiment 1 of Table 2, and the triangular glass rod is drawn into a triangular filling glass fiber, wherein the triangular filling glass fiber has a height of 0.63 mm;

(3) casing pipe absorption fiber drawing: light absorption glass with a good light absorption property is prepared into a light absorption material glass rod according to a glass composition of Embodiment 1 of Table 3, and then the light absorption material glass rod and a cladding glass pipe match to be drawn into the casing pipe absorption fiber of Φ2.8 mm;

(4) mono fiber drawing: an outer side of the cladding glass pipe is uniformly surrounded with the surrounding pipe fiber, and then a core glass rod with a high refractive index and the cladding glass pipe surrounded with the surrounding pipe fiber match to be subjected to mono fiber drawing to obtain the drawn mono fiber, wherein the diameter of the mono fiber is ∠2.8 mm;

(5) multi fiber drawing: the drawn mono fibers are arranged into a multi assembly rod with an orthohexagonal cross section, wherein the number of mono fibers on each side in the multi assembly rod is 6, and the total number of the mono fibers arranged into the multi assembly rod is 91; a mono fiber arranged at a very center of the hexahedron multi assembly rod is replaced with the casing pipe absorption fiber, wherein the fiber diameter of the replaced mono fiber is the same as a fiber diameter of the substituting casing pipe absorption fiber; the triangular glass fibers are filled and inserted into the triangular hole of the multi assembly rod; and the above multi assembly rod obtained after combination is drawn into the multi fiber, wherein a size of hexagonal opposite sides of the multi fiber is 1.27 mm;

(6) multi-multi fiber drawing: the drawn multi fibers are arranged into a multi-multi assembly rod with an orthohexagonal cross section, wherein the number of multi fibers on each side of the multi-multi assembly rod is 12; then the multi-multi assembly rod is drawn into the multi-multi fiber, wherein a size of hexagonal opposite sides of the multi-multi fiber is 0.91 mm; and then the multi-multi fiber is cut with a fixed length to be arranged into a fiber assembly bundle;

(7) heat press fusion: the arranged fiber assembly bundle is put in a heat press fusion mold, then the heat press fusion mold is put in a heat press fusion furnace, heat press fusion is performed according to a designed compression ratio of the fiber assembly bundle before and after heat press fusion, and a fused boule is obtained after heat press fusion;

(8) twisting operation: the fused boule is subjected to cutting, rounding and grinding machining treatments to obtain a fiber optic image inverter block, and the fiber optic image inverter block is subjected to 180° twisting operation in an ultra-short high-temperature twisting furnace, wherein a heating furnace body in the twisting furnace has a width of 3 mm, a distance from the heating furnace body to a surface of the fiber optic image inverter block is 1.0 mm, and twisting operation time for twisting the fiber optic image inverter with ultra-short twister block by 180° is 5 minutes; and then a fiber optic image inverter with ultra-short twister with a fiber diameter being 3.96 μm, a high resolution and a high contrast is obtained.

The fabricated fiber optic image inverter with ultra-short twister has a height of 15 mm and a weight of 19.4 g, and optical crosstalk at a position 0.1 mm away from a cutter edge is 0.94%; a center resolution is 143 lp/mm, and a resolution at edge is 114 lp/mm; a good light transmission property is achieved, and a transmittance within a wavelength range from 400 nm to 700 nm is 72%; and a good fixed-pattern noise property is achieved, and there is no obvious multifiber boundary after being observed under a 10× microscope.

Embodiment 2

A method for fabricating a fiber optic image inverter with ultra-short twister includes the following steps:

(1) surrounding pipe fiber drawing: a round glass rod with a low refractive index and a high strain point temperature is fabricated according to a glass composition in Embodiment 2 of Table 1, and the round glass rod is drawn into the surrounding pipe fiber of Φ1.6 mm;
(2) filling glass fiber drawing: a regular triangle glass rod with a high refractive index and a high transmittance is fabricated according to a glass composition of Embodiment 2 of Table 2, and the regular triangle glass rod is drawn into a triangular filling glass fiber, wherein the triangular filling glass fiber has a height of 0.95 mm;
(3) casing pipe absorption fiber drawing: light absorption glass with a good light absorption property is prepared into a light absorption glass rod according to a glass composition of Embodiment 2 of Table 3, and then the light absorption glass rod and a cladding glass pipe match to be drawn into the casing pipe absorption fiber of Φ4.2 mm;
(4) mono fiber drawing: an outer side of the cladding glass pipe is uniformly surrounded with the surrounding pipe fiber, and then a core glass rod with a high refractive index and the cladding glass pipe surrounded with the surrounding pipe fiber match to be subjected to mono fiber drawing to obtain the drawn mono fiber, wherein the diameter of the mono fiber is Φ4.2 mm;
(5) multi fiber drawing: the drawn mono fibers are arranged into a multi assembly rod with an orthohexagonal cross section, wherein the number of mono fibers on each side in the multi assembly rod is 5, and the total number of the mono fibers arranged into the multi assembly rod is 61; a mono fiber arranged at a very center of the hexahedron multi assembly rod is replaced with the casing pipe absorption fiber, wherein the diameter of the replaced mono fiber is the same as the diameter of the substituting casing pipe absorption fiber; the triangular glass fibers are filled and inserted into the triangular hole of the multi assembly rod; and the above multi assembly rod obtained after combination is drawn into the multi fiber, wherein a size of hexagonal opposite sides of the multi fiber is 1.10 mm;
(6) multi-multi fiber drawing: the drawn multi assemblies are arranged into a multi-multi assembly rod with an orthohexagonal cross section, wherein the number of multi fibers on each side of the multi-multi assembly rod is 14; then the multi-multi assembly rod is drawn into the multi-multi fiber, wherein a size of hexagonal opposite sides of the multi-multi fiber is 0.88 mm; and then the multi-multi fiber is cut with a fixed length to be arranged into a fiber assembly bundle;
(7) heat press fusion: the arranged fiber assembly bundle is put in a heat press fusion mold, then the heat press fusion mold is put in a heat press fusion furnace, heat press fusion is performed according to a designed compression ratio of the fiber assembly bundle before and after heat press fusion, and a fused boule is obtained after heat press fusion;
(8) twisting operation: the fused boule is subjected to cutting, rounding and grinding machining treatments to obtain a fiber optic image inverter block, and the fiber optic image inverter block is subjected to 180° twisting operation in an ultra-short high-temperature twisting furnace, wherein heating body in an ultra-short high-temperature heating furnace has a width of 3.5 mm, a distance from the heating body of the heating furnace to a surface of the fiber optic image inverter block is 1.2 mm, and twisting operation time for twisting the fiber optic image inverter with ultra-short twister block by 180° is 3 minutes; and then a fiber optic image inverter with ultra-short twister with a fiber diameter being 3.94 μm, a high resolution and a high contrast is obtained.

The fabricated fiber optic image inverter with ultra-short twister has a height of 14.9 mm and a weight of 19.3 g, and optical crosstalk at a position 0.1 mm away from a cutter edge is 0.96%; a center resolution is 143 lp/mm, and a resolution at edge is 128 lp/mm; a good light transmission property is achieved, and a transmittance within a wavelength range from 400 nm to 700 nm is 71%; and a good fixed-pattern noise property is achieved, and there is no obvious multifiber boundary after being observed under a 10× microscope.

Embodiment 3

A method for fabricating a fiber optic image inverter with ultra-short twister includes the following steps:
(1) surrounding pipe fiber drawing: a round glass rod with a low refractive index and a high strain point temperature is fabricated according to a glass composition in Embodiment 3 of Table 1, and the round glass rod is drawn into the surrounding pipe fiber of Φ2.0 mm;
(2) filling glass fiber drawing: a regular triangle glass rod with a high refractive index and a high transmittance is fabricated according to a glass composition of Embodiment 3 of Table 2, and the regular triangle glass rod is drawn into a triangular filling glass fiber, wherein the triangular filling glass fiber has a height of 0.5 mm;
(3) casing pipe absorption fiber drawing: light absorption glass with a good light absorption property is prepared into a light absorption glass rod according to a glass composition of Embodiment 3 of Table 3, and then the light absorption glass rod and a cladding glass pipe match to be drawn into the casing pipe absorption fiber of Φ2.4 mm;
(4) mono fiber drawing: an outer side of the cladding glass pipe is uniformly surrounded with the surrounding pipe fiber, and then a core glass rod with a high refractive index and the cladding glass pipe surrounded with the surrounding pipe fiber match to be subjected to mono fiber drawing to obtain the drawn mono fiber, wherein the diameter of the mono fiber is Φ2.4 mm;
(5) multi fiber drawing: the drawn mono fibers are arranged into a multi assembly rod with an orthohexagonal cross section, wherein the number of mono fibers on each side in the multi assembly rod is 7, and the total number of the mono fibers arranged into the multi assembly rod is 127; a mono fiber arranged at a very center of the hexahedron multi assembly rod is replaced with the casing pipe absorption fiber, wherein the diameter of the replaced mono fiber is the same as the diameter of the substituting casing pipe absorption fiber; the triangular glass fibers are filled and inserted into the triangular hole of the multi assembly rod; and the above multi assembly rod obtained after combination is drawn into the multi fiber, wherein a size of hexagonal opposite sides of the multi fiber is 1.30 mm;
(6) multi-multi fiber drawing: the drawn multi fibers are arranged into a multi-multi assembly rod with an orthohexagonal cross section, wherein the number of multi fibers on each side of the multi-multi assembly rod is 11; then the multi-multi assembly rod is drawn into the multi-multi fiber, wherein a size of hexagonal opposite sides of the multi-multi fiber is 0.96 mm; and then the multi-multi fiber is cut with a fixed length to be arranged into a fiber assembly bundle;

(7) heat press fusion: the arranged fiber assembly bundle is put in a heat press fusion mold, then the heat press fusion mold is put in a heat press fusion furnace, heat press fusion is performed according to a designed compression ratio of the fiber assembly bundle before and after heat press fusion, and a fused boule is obtained after heat press fusion;

(8) twisting operation: the fused boule is subjected to cutting, rounding and grinding machining treatments to obtain a fiber optic image inverter block, and the fiber optic image inverter block is subjected to 180° twisting operation in an ultra-short high-temperature twisting furnace, wherein the heating body in an ultra-short high-temperature heating furnace has a width of 4.0 mm, a distance from the heating body of the heating furnace to a surface of the fiber optic image inverter block is 1.5 mm, and twisting operation time for twisting the fiber optic image inverter with ultra-short twister block by 180° is 6 minutes; and then a fiber optic image inverter with ultra-short twister with a fiber diameter being 3.92 μm, a high resolution and a high contrast is obtained.

The fabricated fiber optic image inverter with ultra-short twister has a height of 15.0 mm and a weight of 19.4 g, and optical crosstalk at a position 0.1 mm away from a cutter edge is 0.92%; a center resolution is 143 lp/mm, and a resolution at edge is 128 lp/mm; a good light transmission property is achieved, and a transmittance within a wavelength range from 400 nm to 700 nm is 74%; and a good fixed-pattern noise property is achieved, and there is no obvious multifiber boundary after being observed under a 10× microscope.

Embodiment 4

An actual composition of glass refers to a composition in Embodiment 4 of Table 1, Table 2 and Table 3, and a fiber optic image inverter with ultra-short twister is fabricated by a method the same as Embodiment 1.

The fabricated fiber optic image inverter with ultra-short twister has a height of 15.0 mm and a weight of 19.3 g, and optical crosstalk at a position 0.1 mm away from a cutter edge is 0.96%; a center resolution is 143 lp/mm, and a resolution at edge is 114 lp/mm; a good light transmission property is achieved, and a transmittance within a wavelength range from 400 nm to 700 nm is 73%; and a good fixed-pattern noise property is achieved, and there is no obvious multifiber boundary after being observed under a 10× microscope.

Embodiment 5

An actual composition of glass refers to a composition in Embodiment 5 of Table 1, Table 2 and Table 3, and a fiber optic image inverter with ultra-short twister is fabricated by a method the same as Embodiment 1.

The fabricated fiber optic image inverter with ultra-short twister has a height of 15.0 mm and a weight of 19.3 g, and optical crosstalk at a position 0.1 mm away from a cutter edge is 0.93%; a center resolution is 143 lp/mm, and a resolution at edge is 114 lp/mm; a good light transmission property is achieved, and a transmittance within a wavelength range from 400 nm to 700 nm is 72%; and a good fixed-pattern noise property is achieved, and there is no obvious multifiber boundary after being observed under a 10× microscope.

The above embodiments are merely one type of optional specific implementations of the present application, and general variations and replacements made by those skilled in the art within the scope of the technical solution of the present application are supposed to be covered within the protection scope of the present application.

The invention claimed is:

1. A method for fabricating a fiber optic image inverter with an ultra-short twister, wherein the method comprises the following steps:
    (1) surrounding pipe fiber drawing: drawing a round glass rod with a low refractive index and a high strain point temperature into the surrounding pipe fiber with Φ1.6-2.0 mm;
    (2) filling glass fiber drawing: drawing a glass rod with a high refractive index and a high transmittance into the filling glass fiber;
    (3) casing pipe absorption fiber drawing: preparing a light absorption glass with a light absorption property into a light absorption glass rod, matching the light absorption glass rod and a cladding glass pipe, and then drawing into the casing pipe absorption fiber;
    (4) mono fiber drawing: uniformly surrounding an outer side of the cladding glass pipe with the surrounding pipe fiber, then matching a core glass rod with a high refractive index and the cladding glass pipe surrounded with the surrounding pipe fiber, and then performing drawing of the mono fiber to obtain the drawn mono fiber, wherein a diameter of the mono fiber is the same as a diameter of the casing pipe absorption fiber;
    (5) multi fiber drawing: arranging the drawn mono fibers into a multi assembly rod with an orthohexagonal cross section, wherein the number of mono fibers on each side in the multi assembly rod is N, replacing one mono fiber arranged at a center of the hexagonal multi assembly rod with the casing pipe absorption fiber, and filling and inserting the filling glass fibers into a hole of the multi assembly rod; followed by drawing the multi assembly rod into the multi fiber;
    (6) multi-multi fiber drawing: arranging the drawn multi fibers into a multi-multi assembly rod with an orthohexagonal cross section, then drawing the multi-multi assembly rod into the multi-multi fiber, and then cutting the multi-multi fiber with a fixed length to be arranged into a fiber assembly bundle;
    (7) heat press fusion: putting the arranged fiber assembly bundle in a heat press fusion mold, then putting the heat press fusion mold in a heat press fusion furnace, performing heat press fusion according to a designed compression ratio of the fiber assembly bundle before and after heat press fusion, and obtaining a fused boule after heat press fusion; and
    (8) twisting operation: subjecting the fused boule to cutting, rounding and grinding machining treatments to obtain a fiber optic image inverter block, and subjecting the fiber optic image inverter block to a 180° twisting operation in an ultra-short high-temperature twisting furnace to obtain a fiber optic image inverter with an ultra-short twister;
    wherein a heating furnace body in the ultra-short high-temperature twisting furnace has a width ranging from 3 mm to 4 mm, a distance from the heating furnace body to a surface of the fiber optic image inverter block ranges from 1.0 mm to 2.5 mm, and twisting operation time for twisting the fiber optic image inverter block by 180° ranges from 2 minutes to 9 minutes;

wherein a composition for fabricating a surrounding pipe fiber is composed of the following components by mole percentage content:

| | |
|---|---|
| SiO₂ | 78.1-80.0% |
| Al₂O₃ | 3.1-7.0% |
| B₂O₃ | 2.0-8.0% |
| Li₂O | 0.0001-1.0% |
| Na₂O | 0-2.9% |
| K₂O | 5.1-10.0% |
| CaO | 1.1-3.0% |
| SrO | 0.0001-1.0% |
| ZnO | 1.1-2.0% |
| TiO₂ | 0.0001-1.0% |
| CeO₂ | 0.05-0.2% |
| MgF₂ | 0.0001-2.0% |
| CaF₂ | 0.05-2.0%. |

2. The method according to claim 1, wherein the filling glass fiber is triangular and has a height ranging from 0.50 mm to 0.95 mm; and a diameter of the mono fiber ranges from @2.4 mm to $4.20 mm;
   wherein the total number of mono fibers arranged into the multi assembly rod is (3N(N−1)+1), wherein 8≥N≥3;
   sizes of hexagonal opposite sides of the multi fiber range from 1.10 mm to 1.30 mm; and
   sizes of hexagonal opposite sides of the multi-multi fiber range from 0.86 mm to 1.06 mm.

3. The method according to claim 2, wherein a glass of the surrounding pipe fiber has a refractive index ranging from 1.48 to 1.51; and a mean linear thermal expansion coefficient is $(80\pm5)\times10^{-7}/°$ C. within a range from 30° C. to 300° C., the glass of the surrounding pipe fiber has a strain point temperature ranging from 580° C. to 620° C., an expansion softening temperature ranging from 680° C. to 710° C. and a temperature ranging from 780° C. to 810° C. in viscosity of $10^{7.6}$ dPa·s, a glass of the surrounding pipe fiber and a glass of a core glass rod have the same temperature at a torsion viscosity point of $10^{7.6}$ dPa·s, and the glass of the surrounding pipe fiber has neither devitrification nor phase separation after being subjected to heat preservation for 6 hours at a temperature ranging from 850° C. to 900° C.

4. The method according to claim 1, wherein the composition for fabricating a surrounding pipe fiber is composed of the following components by mole percentage content:

| | |
|---|---|
| SiO₂ | 78.2-79.5% |
| Al₂O₃ | 3.5-6.5% |
| B₂O₃ | 3.0-5.5% |
| Li₂O | 0.1-1.0% |
| Na₂O | 0.1-2.9% |
| K₂O | 6.7-10.0% |
| CaO | 1.1-3.0% |
| SrO | 0.1-1.0% |
| ZnO | 1.1-2.0% |
| TiO₂ | 0.01-1.0% |
| CeO₂ | 0.05-0.2% |
| MgF₂ | 0.05-2.0% |
| CaF₂ | 0.05-2.0%. |

5. The method according to claim 4, wherein a glass of the surrounding pipe fiber has a refractive index ranging from 1.48 to 1.51; and a mean linear thermal expansion coefficient is $(80\pm5)\times10^{-7}/°$ C. within a range from 30° C. to 300° C., the glass of the surrounding pipe fiber has a strain point temperature ranging from 580° C. to 620° C., an expansion softening temperature ranging from 680° C. to 710° C. and a temperature ranging from 780° C. to 810° C. in viscosity of $10^{7.6}$ dPa·s, a glass of the surrounding pipe fiber and a glass of a core glass rod have the same temperature at a torsion viscosity point of $10^{7.6}$ dPa·s, and the glass of the surrounding pipe fiber has neither devitrification nor phase separation after being subjected to heat preservation for 6 hours at a temperature ranging from 850° C. to 900° C.

6. The method according to claim 1, wherein a glass of the surrounding pipe fiber has a refractive index ranging from 1.48 to 1.51; and a mean linear thermal expansion coefficient is $(80\pm5)\times10^{-7}/°$ C. within a range from 30° C. to 300° C., the glass of the surrounding pipe fiber has a strain point temperature ranging from 580° C. to 620° C., an expansion softening temperature ranging from 680° C. to 710° C. and a temperature ranging from 780° C. to 810° C. in viscosity of $10^{7.6}$ dPa·s, a glass of the surrounding pipe fiber and a glass of a core glass rod have the same temperature at a torsion viscosity point of $10^{7.6}$ dPa·s, and the glass of the surrounding pipe fiber has neither devitrification nor phase separation after being subjected to heat preservation for 6 hours at a temperature ranging from 850° C. to 900° C.

7. The method according to claim 1, wherein the composition for fabricating a filling glass fiber is composed of the following components by mole percentage content:

| | |
|---|---|
| SiO₂ | 15.0-25.0% |
| Al₂O₃ | 0.0001-0.5% |
| B₂O₃ | 20.0-30.0% |
| MgO | 1.01-2.0% |
| SrO | 1.0-5.0% |
| BaO | 15.0-25.0% |
| ZnO | 0.5-2.0% |
| SnO₂ | 0.1-0.2% |
| TiO₂ | 5.0-9.0% |
| WO₃ | 1.0-5.0% |
| La₂O₃ | 5.0-10.0% |
| Nb₂O₅ | 1.0-5.0% |
| Y₂O₃ | 0.5-2.0% |
| Ta₂O₅ | 1.1-5.0% |
| Gd₂O₃ | 0.0001-0.9%. |

8. The method according to claim 7, wherein the composition for fabricating a filling glass fiber is composed of the following components by mole percentage content:

| | |
|---|---|
| SiO₂ | 19.0-25.0% |
| Al₂O₃ | 0.1-0.5% |
| B₂O₃ | 25.0-30.0% |
| MgO | 1.01-2.0% |
| SrO | 1.0-5.0% |
| BaO | 15.0-25.0% |
| ZnO | 0.5-2.0% |
| SnO₂ | 0.1-0.2% |
| TiO₂ | 5.0-9.0% |
| WO₃ | 1.0-5.0% |
| La₂O₃ | 5.0-9.0% |
| Nb₂O₅ | 1.0-5.0% |
| Y₂O₃ | 0.5-2.0% |
| Ta₂O₅ | 1.1-5.0% |
| Gd₂O₃ | 0.1-0.9%. |

9. The method according to claim 8, wherein glass of the filling glass fiber has a refractive index ranging from 1.80 to 1.82; a mean linear thermal expansion coefficient is $(90\pm5)\times10^{-7}/°$ C. within a range from 30° C. to 300° C., the glass of the filling glass fiber has a strain point temperature ranging from 610° C. to 630° C., and the glass of the filling glass fiber has a transmittance greater than 95% within a spectrum of 400 nm to 700 nm and has neither devitrification nor phase separation after being subjected to heat preservation for 6 hours at a temperature ranging from 850° C. to 900° C.

10. The method according to claim 7, wherein glass of the filling glass fiber has a refractive index ranging from 1.80 to 1.82; a mean linear thermal expansion coefficient is $(90\pm5)\times10^{-7}/°$ C. within a range from 30° C. to 300° C., the glass of the filling glass fiber has a strain point temperature ranging from 610° C. to 630° C., and the glass of the filling glass fiber has a transmittance greater than 95% within a spectrum of 400 nm to 700 nm and has neither devitrification nor phase separation after being subjected to heat preservation for 6 hours at a temperature ranging from 850° C. to 900° C.

11. The method according to claim 1, wherein a composition for light absorption glass is composed of the following components by mole percentage content:

| | |
|---|---|
| SiO$_2$ | 71.0-80.0% |
| Al$_2$O$_3$ | 0.5-5.0% |
| B$_2$O$_3$ | 1.0-5.0% |
| Na$_2$O | 1.0-11.0% |
| K$_2$O | 6.0-11.0% |
| MgO | 0.1-2.0% |
| CaO | 0.1-2.0% |
| BaO | 0.0001-0.04% |
| TiO$_2$ | 0.0001-1.0% |
| Co$_2$O$_3$ | 0.1-0.4% |
| NiO | 0.1-1.0% |
| MnO | 1.0-5.0% |
| V$_2$O$_3$ | 0.1-1.0% |
| CeO$_2$ | 0.0001-0.2% |
| CuO | 0.0001-0.05%. |

12. The method according to claim 11, wherein the composition for light absorption glass is composed of the following components by mole percentage content:

| | |
|---|---|
| SiO$_2$ | 74.0-80.0% |
| Al$_2$O$_3$ | 1.5-5.0% |
| B$_2$O$_3$ | 1.0-5.0% |
| Na$_2$O | 5.1-11.0% |
| K$_2$O | 8.1-11.0% |
| MgO | 0.1-2.0% |
| CaO | 0.1-2.0% |
| BaO | 0.01-0.04% |
| TiO$_2$ | 0.01-1.0% |
| Co$_2$O$_3$ | 0.1-0.4% |
| NiO | 0.1-1.0% |
| MnO | 1.0-5.0% |
| V$_2$O$_3$ | 0.1-1.0% |
| CeO$_2$ | 0.01-0.2% |
| CuO | 0.01-0.05%. |

13. The method according to claim 12, wherein the light absorption glass has a uniform light absorption ability and a spectral absorption effect under a thickness of 0.5±0.01 mm and within a wavelength range from 510 nm to 660 nm, and has a spectrum transmittance less than or equal to 3.0%; the light absorption glass has a thermal expansion coefficient of $(85\pm5)\times10^{-7}/°$ C.; and neither devitrification nor phase separation occurs after being subjected to heat preservation for 6 hours at a temperature ranging from 850° C. to 900° C.

14. The method according to claim 11, wherein the light absorption glass has a uniform light absorption ability and a spectral absorption effect under a thickness of 0.5±0.01 mm and within a wavelength range from 510 nm to 660 nm, and has a spectrum transmittance less than or equal to 3.0%; the light absorption glass has a thermal expansion coefficient of $(85\pm5)\times10^{-7}/°$ C.; and neither devitrification nor phase separation occurs after being subjected to heat preservation for 6 hours at a temperature ranging from 850° C. to 900° C.

15. A fiber optic image inverter with an ultra-short twister fabricated by the method according to claim 1, wherein the fiber optic image inverter with an ultra-short twister has an overall height not more than 15 mm and a weight less than 20 g; optical crosstalk of the fiber optic image inverter with an ultra-short twister in a position 0.1 mm away from a cutter edge is less than 1.0%; the fiber optic image inverter with an ultra-short twister has a fiber diameter not more than 4.0 micrometers; the fiber optic image inverter with an ultra-short twister has a resolution at center greater than 140 lp/mm and resolution at edge greater than 110 lp/mm; the fiber optic image inverter with an ultra-short twister has a transmittance greater than 70% within a wavelength range from 400 nm to 700 nm; and the fiber optic image inverter with an ultra-short twister has no multifiber boundary after being observed under a 10× microscope.

16. Application of the fiber optic image inverter with an ultra-short twister according to claim 15 in a low-light-level image intensifier.

17. The application according to claim 16, wherein the low-light-level image intensifier is applied to a helmet night-vision device.

* * * * *